(12) United States Patent
Asahara

(10) Patent No.: US 10,481,582 B2
(45) Date of Patent: Nov. 19, 2019

(54) PROCESS FOR CONTROLLING A MACHINE TOOL

(71) Applicants: Citizen Watch Co., Ltd., Tokyo (JP); Citizen Machinery Co., Ltd., Nagano (JP)

(72) Inventor: Noriyuki Asahara, Saitama (JP)

(73) Assignees: Citizen Watch Co., Ltd, Tokyo (JP); Citizen Machinery Co., Ltd., Nagano (JP)

(*) Notice: Subject to any disclaimer, the term of this patent is extended or adjusted under 35 U.S.C. 154(b) by 67 days.

(21) Appl. No.: 15/686,587

(22) Filed: Aug. 25, 2017

(65) Prior Publication Data

US 2017/0364055 A1    Dec. 21, 2017

Related U.S. Application Data

(62) Division of application No. 14/377,405, filed as application No. PCT/JP2013/052559 on Feb. 5, 2013, now abandoned.

(30) Foreign Application Priority Data

Feb. 15, 2012  (JP) .................................. 2012-030619

(51) Int. Cl.
*G06F 19/00*    (2018.01)
*G05B 19/4063*  (2006.01)
(Continued)

(52) U.S. Cl.
CPC ....... *G05B 19/4063* (2013.01); *B23Q 1/0045* (2013.01); *B23Q 11/0089* (2013.01);
(Continued)

(58) Field of Classification Search
CPC ................................ H02S 40/10; H02S 50/00
See application file for complete search history.

(56) References Cited

U.S. PATENT DOCUMENTS

| 4,396,976 A   | 8/1983 | Hyatt |
| 6,112,133 A * | 8/2000 | Fishman .......... G05B 19/40937 700/180 |

(Continued)

FOREIGN PATENT DOCUMENTS

| JP | 3044821 A    | 1/1998 |
| JP | 2000-094266 A | 9/1998 |

(Continued)

*Primary Examiner* — Kidest Bahta
(74) *Attorney, Agent, or Firm* — Howson & Howson LLP

(57) ABSTRACT

A machine tool includes a machining chamber, an illuminator in the machining chamber, and an NC unit. The NC unit includes a manual execution unit for executing the machining operation via a pulse signal generated in response to operation of a manually operated part, and has a one-block stop mode in which the NC program is executed for one block and then stopped. A notification unit issues a notification of completion of the execution of one block of the NC program while the machining operation is executed manually using the manual execution unit in the one-block stop mode, and the notification unit includes the illuminator. A change in the illumination state of the illuminator enables an operator to observe the interior of the machining chamber continuously while being notified of the completion of the execution of the one block of the NC program.

3 Claims, 3 Drawing Sheets

(51) Int. Cl.
*B23Q 11/00* (2006.01)
*B23Q 11/08* (2006.01)
*B23Q 17/24* (2006.01)
*B23Q 1/00* (2006.01)
*G05B 19/406* (2006.01)

(52) U.S. Cl.
CPC ...... *B23Q 11/0891* (2013.01); *B23Q 17/2404* (2013.01); *G05B 19/406* (2013.01); *G05B 2219/31379* (2013.01); *G05B 2219/34384* (2013.01); *G05B 2219/34394* (2013.01)

(56) References Cited

U.S. PATENT DOCUMENTS

| | | | |
|---|---|---|---|
| 6,892,111 B2 * | 5/2005 | Sakakibara | G05B 19/4148 700/108 |
| 7,623,934 B2 | 11/2009 | Iefuji et al. | |
| 7,634,992 B2 | 12/2009 | Bujeau | |
| 7,828,454 B2 | 11/2010 | Seitz | |
| 7,949,422 B1 * | 5/2011 | Little | G05B 19/056 700/17 |
| 8,688,258 B2 * | 4/2014 | Miller | G05B 19/414 700/159 |
| 2004/0251238 A1 * | 12/2004 | Ogata | B23H 7/20 219/69.12 |
| 2006/0054155 A1 | 5/2006 | Bujeau | |
| 2008/0025015 A1 | 1/2008 | Seitz | |
| 2011/0208346 A1 | 8/2011 | Nagano | |
| 2015/0019002 A1 | 1/2015 | Asahara | |

FOREIGN PATENT DOCUMENTS

| | | |
|---|---|---|
| JP | 2003-145389 A | 5/2003 |
| JP | 2005-147465 A | 6/2005 |
| JP | 2008-036803 A | 2/2008 |
| JP | 2010-164250 A | 7/2010 |
| JP | 201158214 A | 3/2011 |
| JP | 2012-003537 A | 1/2012 |

* cited by examiner

PROCESS FOR CONTROLLING A MACHINE TOOL

CROSS-REFERENCE TO RELATED APPLICATION

This application is a division of patent application Ser. No. 14/377,405, filed Aug. 7, 2014 now abandoned. The entire disclosure of application Ser. No. 14/377,405 is here incorporated by reference.

FIELD OF THE INVENTION

This invention relates to a process for operating a machine tool having a novel means for notifying a machine operator of the completion of a block of a numeric control (NC) program.

BACKGROUND OF THE INVENTION

Japanese laid-open patent application No. 2011-175316 describes a conventional machine tool has a machining chamber for machining a material, an illuminator provided in the machining chamber, and an NC unit for controlling a machining operation on the basis of an NC program. The conventional machine tool has a one-block stop mode in which the NC program is executed for only one block thereof, and then the machine tool stops its operation.

In the one-block stop mode, the operation of the NC program can be checked one block at a time. The conventional machine tool also has a manual execution unit for manually executing the NC program via a pulse signal generated in response to operation of a manually operated part such as a manual pulse handle, to operate the machine tool.

SUMMARY OF THE INVENTION

A problem with the above-described conventional machine tool is that, when a worker operates the manually operated part to execute the NC program using the manual execution unit in the one-block stop mode, a notification of the completion of the execution of one block of the NC program is displayed on an operation panel provided outside the machining chamber. Thus, the worker may not immediately notice the completion of execution of one block of the NC program while observing the interior of the machining chamber, and may operate the manual operation part unnecessarily.

An object of the invention, is to address the above-described problem, and to provide a machine tool whereby a worker operating a manual operation part in the one-block stop mode can notice that one block of a machining program has been executed while observing the interior of a machining chamber According to a first aspect of the invention, a machine tool includes a machining chamber for machining a material, an illuminator provided in the machining chamber, and an NC unit for controlling a machining operation on the basis of an NC program. The NC unit includes a manual execution unit for executing the machining operation via a pulse signal generated in response to operation of a manually operated part, and has a one-block stop mode in which the NC program is executed for one block and then stopped. A notification unit is provided for issuing a notification of completion of executing one block of the NC program while the machining operation is manually executed using the manual execution unit in the one-block stop mode. The notification unit includes the illuminator.

According to a second aspect of the invention, the notification unit is configured to issue a notification by changing an illumination state in the machining chamber achieved by the illuminator.

According to a third aspect of the invention, the notification unit is configured to reduce the amount of luminescence of the illuminator after one block of the NC program has been executed.

According to a fourth aspect of the invention, the notification unit is configured to blink the illuminator.

With the machine tool according to the first aspect of the invention, a worker observing the interior of the machining chamber can easily notice a notification of completion of the execution of one block of the NC program issued via the illuminator. Thus, the worker operating the manually operated part in the one-block stop mode can know, without looking at an operation panel provided outside the machining chamber, that one block of the NC program has been executed while observing the action of various action parts in the machining chamber, such as a spindle or a tool post, which should be checked as the worker operates the manually operated part.

Because the notification unit of the machine tool in accordance with the second aspect of the invention is configured to issue a notification by changing the illumination state in the machining chamber achieved by the illuminator, the worker can notice the change of the illumination state in the machining chamber while observing the interior of the machining chamber through a window. Thus, the worker operating the manually operated part in the one-block stop mode can know that one block of the NC program has been executed while observing the interior of the machining chamber without looking at the operation panel provided outside the machining chamber.

Because the notification unit of the machine tool according to the third aspect of the invention is configured to reduce the amount of luminescence of the illuminator after one block of the NC program has been executed, the interior of the machining chamber becomes darker when one block of the NC program has been executed. Thus, the worker can easily know that one block of the NC program has been executed.

Because the notification unit of the machine tool according to the fourth aspect of the invention is configured to blink the illuminator, the illuminator blinks after one block of the NC program has been executed. The blinking of the illuminator also makes it easy for the worker to know that one block of the NC program has been executed.

DETAILED DESCRIPTION OF THE PREFERRED EMBODIMENTS

Details of a machine tool as an embodiment of the invention do not matter as long as the machine tool includes a machining chamber for machining a material, an illuminator provided in the machining chamber, and an NC unit for controlling a machining operation on the basis of an NC program, the NC unit a manual execution unit for executing the machining operation via a pulse signal generated in response to operation of a manually operated part, and has a one-block stop mode in which the NC program is executed for one block and then stopped, and a notification unit is provided for issuing a notification of completion of executing one block of the NC program while the machining operation is manually executed using the manual execution unit in the one-block stop mode, and the notification unit includes the illuminator, so that a worker operating a manual pulse handle in the one-block stop mode can know that one block of the NC program has been executed while observing the inside of the machining chamber without looking at an operation panel provided outside the machining chamber.

For example, it does not matter how the illumination of the illuminator is changed as long as a worker observing the interior of the machining chamber can notice the change of the illumination in the machining chamber.

Figure 1:
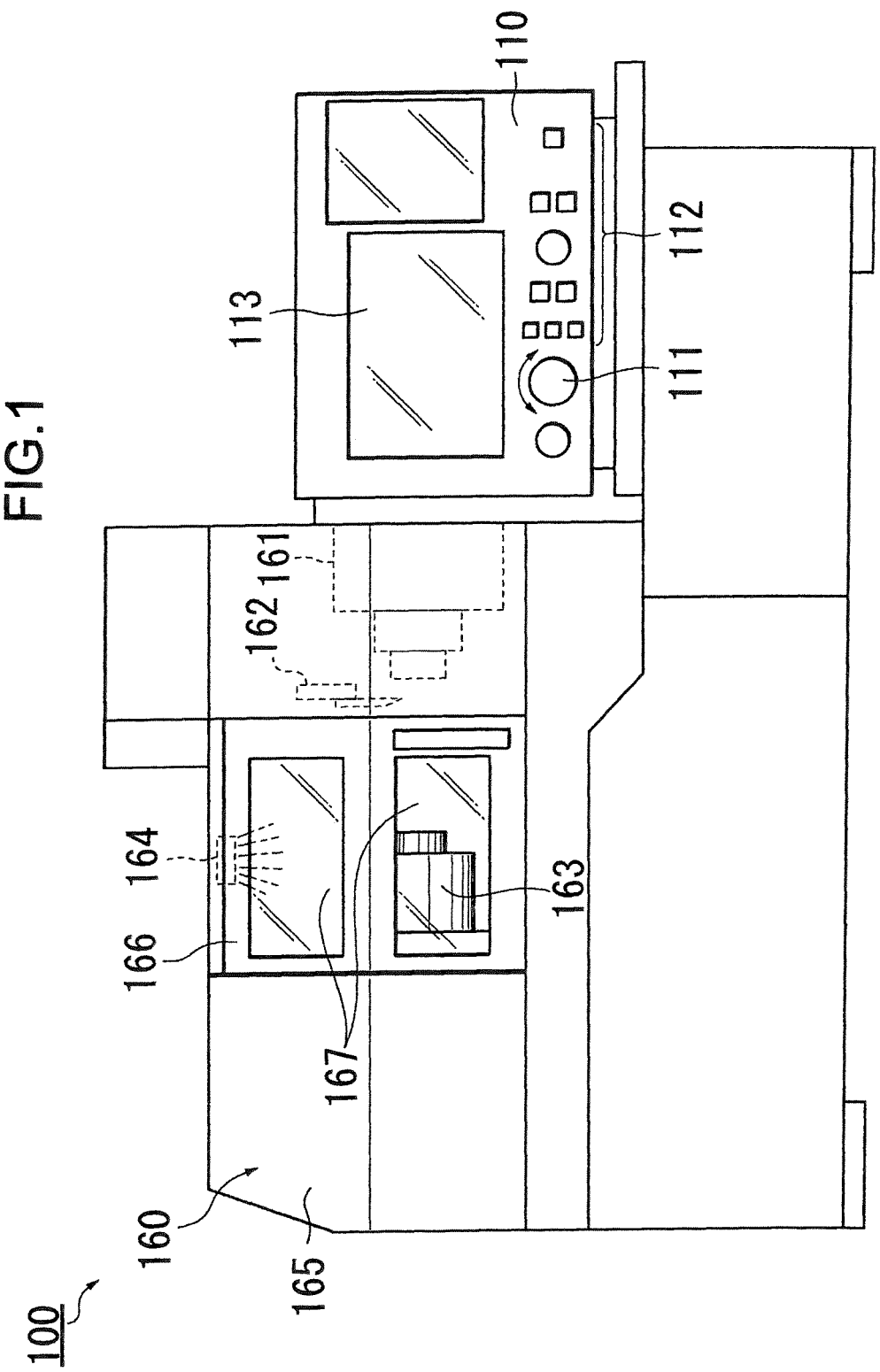
FIG. 1 is a front view schematically illustrating a machine tool as one embodiment of the invention.
Figure 2:
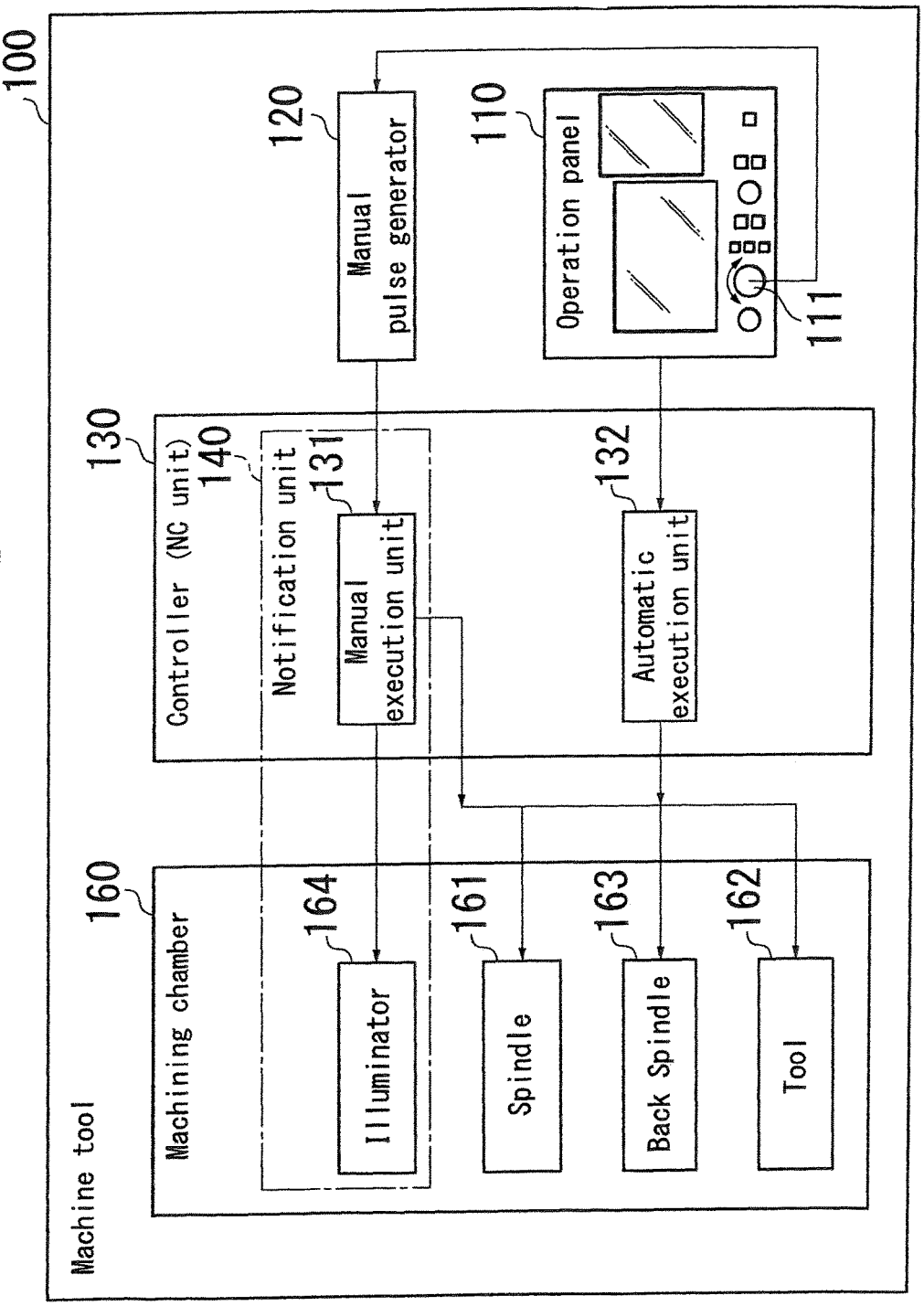
FIG. 2 is a schematic block diagram of a machine tool as one embodiment of the invention.
Figure 3:
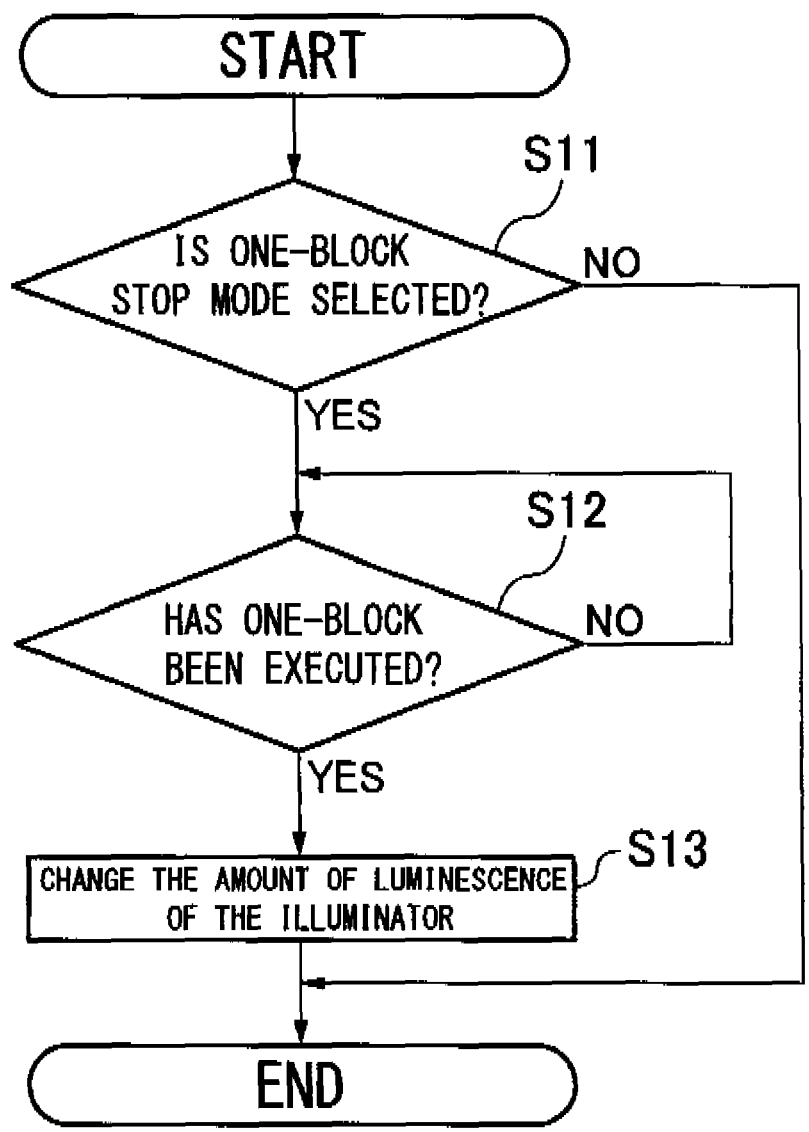
FIG. 3 is a flow chart illustrating a sample operation of a machine tool as one embodiment of the invention.

As shown in FIGS. 1 to 3, the machine tool 100 includes an operation panel 110 to be operated by a worker, a controller 130 (FIG. 2) including an NC unit, and a machining chamber 160 in which a material, or workpiece, is machined in accordance with an NC program. Provided on the operation panel 110 are a manual pulse handle 111, which is one example of a manually operated part, switch buttons 112, and a monitor 113, for example. The machining chamber 160 includes a cover 165, a door 166, and a window 167, for example. The interior of the machining chamber 160 houses a spindle 161, a tool 162, a back spindle 163, and an illuminator 164, for example.

The manual pulse handle 111 may be manually rotated by a worker for executing the NC program in accordance with a mode to manually operate the machine tool. Plural switch buttons 112 are provided and may be used for activating the machine tool 100, stopping the operation of the machine tool 100, and selecting a mode. The monitor 113 displays current settings and the NC program.

The spindle 161 and the back spindle 163 can grip, rotate, or move the workpiece. The tool 162 can perform cutting and other operations on the workpiece. The rotation and movement of the spindle 161, the back spindle 163, and the tool 162 are controlled by the controller 130 on the basis of the NC program to machine the workpiece.

The illuminator 164 is provided in the machining chamber 160 to illuminate the workpiece, the tool 162, the spindle 161, and the back spindle 163. The cover 165 is provided to cover the machining chamber 160. The door 166 can be opened or closed as needed. The window 167 is provided on the door 166 at a position such that it enables a worker to see one or more of the workpiece, the tools 162, the spindle 161, and the back spindle 163, in the machining chamber 160 as the worker operates the operation panel 110.

The controller 130 is equipped with a CPU and a RAM (not shown in FIG. 2), and includes a manual execution unit 131 for manually executing the NC program via operation of the manual pulse handle 111, and an automatic execution unit 132 for automatically executing the NC program. The controller 130 has a manual execution mode achieved by the manual execution unit 131 and an automatic execution mode achieved by the automatic execution unit 132. The manual execution mode and the automatic execution mode can be selected and switched on the operation panel 110.

The manual pulse handle 111 is connected to the controller 130 via a manual pulse generator 120. The manual pulse generator 120 generates a pulse signal in response to rotational operation of the manual pulse handle 111. An output pulse signal generated by the manual pulse generator 120 is transmitted to the manual execution unit 131.

The controller 130 is configured so that, when the manual execution mode is selected, the manual execution unit 131 executes the NC program in accordance with a pulse signal from the manual pulse generator 120 to machine a workpiece in the machining chamber 160. The controller 130 is also configured so that, when the automatic execution mode is selected, the automatic execution unit 132 automatically and sequentially executes the NC program to machine a material in the machining chamber 160 automatically.

The controller 130 also has a one-block stop mode in which the NC program is executed for one block and then stopped, and a normal mode in which all blocks of the NC program are executed sequentially. The one-block stop mode and the normal mode can be selected and switched on the operation panel 110.

The controller 130 is configured so as to be able to detect completion of the execution of one block of the NC program. In the one-block stop mode, a machining operation automatically stops when one block of the NC program has been executed, and execution of another block of the NC program can be started by operating the switch buttons 112 on the operation panel 110. By selecting the one-block stop mode of the controller 130, a worker can debug the NC program one block at a time and check, for example, the operating condition of the spindle 161, the back spindle 163, and the tool 162.

The machine tool 100 further includes a notification unit 140 (FIG. 2) for issuing a notification of the completion of the execution of one block of the NC program in the one-block stop mode. The notification unit 140 includes the illuminator 164. The notification unit 140 is configured so that the controller 130 changes the amount of luminescence of the illuminator 164 in the machining chamber 160 after detecting the completion of the execution of one block of the NC program. This enables a worker, observing the interior of the machining chamber 160 through the window 167, to notice the change of the illumination in the machining chamber 164 achieved by the illuminator 164 and thereby know that one block of the NC program has been executed.

As shown in FIG. 3, in step S11, the controller 130 determines whether or not the one-block stop mode is currently selected. If the one-block stop mode is currently selected, the operation proceeds to step S12; otherwise the operation is finished.

In step S12, the controller 130 determines whether or not one block of the NC program has been executed. If completion of the execution of one block of the NC program is detected, the operation proceeds to step S13; otherwise step S12 is repeated until completion of the execution of one block of the NC program is detected.

In step S13, the controller 130 changes the amount of luminescence of the illuminator 164 by causing the illuminator 164 to blink, for example.

The one-block stop mode can be selected in both the manual execution mode and the automatic execution mode. Particularly, when the one-block stop mode is selected in the manual execution mode, a worker is observing the interior of the machining chamber 160 through the windows 167, checking the position of the spindle 161 and the tool 162, for example, as the worker operates the manual pulse handle 111. Thus, the worker, observing the interior of the machining chamber 160 through the windows 167, can notice the change of the illumination in the machine chamber 160 and thereby know that one block of the NC program has been executed.

The change of the amount of luminescence of the illuminator 164 is achieved, for example, by reducing the amount of luminescence of the illuminator 164 after one block of the NC program has been executed. In this way, because the interior of the machining chamber 160 becomes darker when execution of one block of the NC program has completed, the worker can easily notice the change of the illumination in the machining chamber 160.

The change of the amount of luminescence of the illuminator 164 may also be achieved by blinking the illuminator 164. In this way, because the illuminator 164 blinks when one block of the NC program has been executed, the worker can easily notice the change of the illumination in the machining chamber 160.

After knowing that one block of the NC program has been executed, the worker can operates the switch buttons 112 on the operation panel 110 to return the luminescence of the illuminator 164 to the state in which it was prior to completion of the execution of one block of the NC program.

When checking the operation of a next block of the NC program, the worker operates the switch buttons 112 as well as the manual pulse handle 111 on the operation panel 110 to start executing the next block of the NC program. In other words, the worker repeats steps S11 to S13.

As described above, the machine tool 100, as one embodiment of the invention, includes the machining chamber 160 for machining a material, the illuminator 164 provided in the machining chamber 160, and the controller 130, which is an NC unit for controlling a machining operation on the basis of an NC program. The controller 130 includes the manual execution unit 131 for executing the machining operation via a pulse signal generated in response to operation of the manual pulse handle 111, which is one example of a manually operated part, and has the one-block stop mode in which the NC program is executed for one block and then stopped. The notification unit 140 is provided for issuing a notification of a completion of executing one block of the NC program while the machining operation is executed manually using the manual execution unit 131 in the one-block stop mode. The notification unit 140 includes the illuminator 164.

Because the notification unit 140 is configured to issue a notification by changing the illumination state in the machining chamber 160 achieved by the illuminator 164, a worker operating the manual pulse handle 111 in the one-block stop mode can know, without looking at the operation panel 110 provided outside the machining chamber 160, that one block of the NC program has been executed while observing the action of various action parts in the machining chamber 160, such as the tool 162, a tool post holding the tool 162, the spindle 161, and the back spindle 163, or the state of the workpiece, which should be checked as the worker operates the manual pulse handle 111.

Because the notification unit 140 is configured to reduce the amount of luminescence of the illuminator 164 after one block of the NC program has been executed, the worker can easily know that one block of the NC program has been executed. Similarly, if the notification unit 140 is configured to cause the illuminator 164 to blink, the worker can easily know that the execution of one block of the NC program has been completed.

What is claimed is:

1. A process by which an operator controls a machine tool, said machine tool comprising:
   a machining chamber;
   a tool arranged in the machining chamber;
   an illuminator provided in the machining chamber;
   an NC unit for performing a control of a machining operation in the chamber on the basis of an NC program, the NC unit including a manual control and a manual execution unit responsive to said manual control, and being operable alternatively in an automatic mode, and in a manual mode wherein said control is under a control of said manual execution unit, and said NC unit having a selectable one-block stop mode in which the NC program is executed for one block and then stopped; and
   a notification unit for issuing a notification to said operator, while said operator is continuously visually observing the interior of the machining chamber while operating the machine tool, of completion of the execution of said one block of the NC program while said control is manually executed using the manual execution unit in the one-block stop mode;
   wherein said notification unit comprises the illuminator; and
   wherein, in said process:
   said operator, by operating said manual control, causes the manual execution unit in said one block stop mode to execute the machining operation;
   throughout said control using the manual execution unit in said one block stop mode, said operator continuously visually observes the machining operation in said machining chamber using the manual execution unit in said one block stop mode;
   said illuminator in the machining chamber provides continuous illumination at a level of luminescence sufficient to enable said continuous visual observation by said operator of the machining operation; and
   said notification unit causes a change in the level of illumination emitted by said illuminator upon completion of the execution of said one block of the NC program, whereby the operator is notified of the completion of the execution of said one block of the NC program while continuously visually observing the machining operation.

2. The process according to claim 1, wherein the notification unit reduces the level of illumination emitted by said illuminator upon completion of the execution of said one block of the NC program.

3. The process according to claim 1, wherein the notification unit causes said the illuminator to blink upon completion of the execution of said one block of the NC program.

* * * * *